United States Patent Office 3,457,311
Patented July 22, 1969

3,457,311
PROCESS FOR PREPARING PRIMARY AND SECONDARY AMINES FROM AMIDES
Harlan E. Tiefenthal, Western Springs, and Eugene J. Miller, Jr., Wheaton, Ill., and Ago Mais, Trenton, N.J., assignors, by mesne assignments, to Armour Industrial Chemical Company, a corporation of Delaware
No Drawing. Filed Apr. 11, 1967, Ser. No. 629,906
Int. Cl. C07c 85/12, 85/00
U.S. Cl. 260—583        12 Claims

ABSTRACT OF THE DISCLOSURE

A process for preparing primary and secondary amines by an hydrolysis reaction of amides and molten caustic in mole ratio of caustic to amide of at least 1:1.

BACKGROUND OF THE INVENTION

This invention pertains to a chemical process for preparing primary and secondary amines; and particularly to preparing primary-, secondary-, and tertiary-aliphatic amines and aryl amines.

It is known that amides can generally be hydrolyzed to amines. One commonly used method for hydrolyzing substituted amides utilizes aqueous sulfuric acid e.g. E. T. Roe and D. Swern JACS, 75, 5479 (1953). This method is economically unattractive because a large excess of acid is required and extremely long reaction times are necessary (up to 100 hours). Further, after the hydrolysis is complete, the amine product is tied-up as an acid salt and large amounts of caustic are required to liberate the product as free amine. U.S. Patents 3,152,180 and 3,017,435 teach the use of 40–50% aqueous sodium hydroxide solutions to neutralize the reaction solution and to isolate the amines hydrolyzed by means of acid hydrolysis. The product obtained is generally dark in color and requires further purification.

Another commonly used method for hydrolyzing substituted amides to obtain amines utilizes aqueous or alcoholic caustic. U.S. Patents 3,209,026, 3,190,882, and 2,587,043 exemplify the usual aqueous caustic method. Hydrolysis with aqueous caustic is slow and requires long reaction times. The reaction can be speeded up using an organic co-solvent (such as low molecular weight alcohols) and increasing the reaction temperatures. These modifications necessitate the use of expensive pressure equipment; for example, when aqueous methanol is used at 227° C., a pressure of 310 p.s.i. is developed. Even at these temperatures and pressures, the reaction generally requires several hours to reach completion and further separation of the product from the hydrolyzing medium is required. Again, the crude amine product obtained is dark in color and must be purified by distillation.

It is known to produce primary amines by reacting a secondary-or tertiary-alkyl or cycloalkyl formamide with solid dry sodium hydroxide, both reactants being in substantially anhydrous condition (U.S. Patent 2,773,097 to Albert et al.). The Albert patent teaches a batch operation requiring about a three hour contact time between the reactants at temperatures of about 100–180° C. A diluent such as mineral oil is desirable in the process of this patent to permit agitation of the reaction mixture. Only lower chain length alkyl formamides are desirable reactants, although the process is disclosed to be operable up to dodecyl.

SUMMARY OF THE INVENTION

We were surprised to discover that mono- and di-substituted amides can be very rapidly hydrolyzed with molten caustic to primary and secondary amines. It is common knowledge that amines decompose and deaminate at elevated temperatures, and the fusion point of caustic materials is high (for example about 290° C. for NaOH and 345° C. for KOH). Thus we were surprised that we obtain high yields (in some instances better than 95%) of amines with little or no deamination. Also, our amine products are light colored and do not require additional purification. Further, our process has short reaction times, an the time of contact between the reactants is very short.

Therefore, it is an object of this invention to provide a process for preparing primary and secondary amines by hydrolysis of mono- and di- substituted amides with molten caustic. Another object is to provide a process for the hydrolysis of primary-, secondary-, and tertiary aliphatic amides with molten caustic to primary and secondary aliphatic amines. Still another object is to provide a process for the hydrolysis of aryl substituted amides with molten caustic to aryl substituted amines. A further object is to provide a process for preparing primary and secondary amines by hydrolysis of mono- and di-substituted amides with molten caustic in very short times of reaction and contact time between the reactants, so the process may easily be adapted to continuous single and multi-pass operations. A still further object is to provide a process for hydrolysis of mono- and di-substituted amides with molten caustic, in very short periods of reaction time, to give high yields of light-colored primary and secondary amine products that do not require additional purification. It is also an object of this invention to provide an economical process for the preparation of primary and secondary amines by the hydrolysis of mono- and di-substituted amides without the need for expensive pressure equipment, further work-up of the product, or additional solvent, diluent or other chemicals. Other objects and advantages will become apparent from the ensuing description and examples.

DETAILED DESCRIPTION OF THE INVENTION

In a specific embodiment, our invention may be exemplified by the process for preparing primary and secondary amines comprising reacting an amide selected from the group consisting of mono- and di-substituted amides with a caustic hydrolysis agent in the molten state to form the amine, the caustic agent being present in quantity to the amide in a mole ratio of at least 1:1, and separating the amine formed from the reaction mixture. The reaction stoichiometery for complete conversion is satisfied when 2.0 moles of caustic are used to hydrolyze each mole of amide. However, this is not a preferred choice of ratios since toward the end of the reaction, the reaction medium may tend to solidify due to increasing amounts of sodium formate, acetate, etc. and sodium carbonate being formed. A desirable range of caustic to amide is from about 2:1 to about 20:1, with about 2.5:1 to 10:1 being especially desirable. Additional caustic may be used, but without substantial further advantage.

The above reaction may be described by the following chemical equation for the preparation of illustrative primary amines:

wherein R is selected from the group consisting of an aliphatic hydrocarbon radical and an aryl radical, and R' is selected from the group consisting of H and short chain alkyl radicals having from 1 to 6 carbon atoms. In a secondary reaction the sodium salt formed above decomposes at elevated temperatures in the presence of additional sodium hydroxide to sodium carbonate and hydrocarbon as follows:

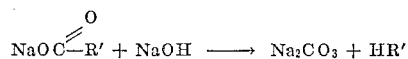

When R is aliphatic, it may be straight or branched chain, cyclic, saturated or unsaturated. The aryl and aliphatic hydrocarbons may be substituted with relatively unreactive hydrocarbon radicals such as amino, phenyl, napthyl, tolyl, anisyl, etc.

The useful amides also contain either hydrogen or a lower alkyl group attached to the carbonyl bonding in the molecule. The alkyl group may contain from 1 to 6 carbon atoms. Formamides and acetamides are preferred; thus R' is preferably H or methyl. Useful higher homologues will include propionamide, butyramide, valeramide, capronylamide, hexamide and the like.

Thus a large number of aliphatic and aryl amides and substituted amides may serve as reactants in our process. Polyamides may serve as the amide reactant. Mixtures of amides may be used.

Exemplary mono-N-substituted alkyl amides preferred in our process for preparing alkyl primary amines may be primary-, secondary-, and tertiary-alkyl; e.g.:

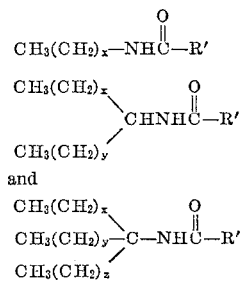

wherein $x$, $y$ and $z$ are each integers whose sum is any particular molecule may vary preferably from 0 to 46, and R' is as defined hereinabove.

Of particular interest in the practice of our invention is the preparation of N-secondary-alkyl amines from N-sec-alkyl amide reactants, such as those obtained from amidation of alpha-olefins. Such amides may be obtained from amidation of single cut alpha-olefins varying in chain length from $C_3$ to $C_{48}$ as well as from mixtures of alpha-olefins varying in chain length from $C_3$ to $C_{48}$. Chain lengths from $C_4$–$C_{26}$ are generally preferred.

In similar fashion, we may utilize aryl substituted amides, e.g.:

as well as di-substituted amides, viz.:

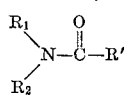

wherein $R_1$ and $R_2$ are like or unlike, aliphatic hydrocarbon or aryl radicals.

Exemplary caustic materials which are desirable for use in the molten state in the practice of our invention include sodium hydroxide, potassium hydroxide, and mixtures thereof. Other alkali metal hydroxides may be used. Sodium hydroxide is generally preferred but this is due mainly to economic considerations, and potassium hydroxide or mixtures of potassium and sodium hydroxides may be desirably used as well. Mixtures of the caustic agent will be desired in instances when the melting point of sodium hydroxide or potassium hydroxide is above the desired reaction temperature. As is well known in the art, various mixtures of sodium hydroxide and potassium hydroxide will melt at lower temperatures than either sodium hydroxide or potassium hydroxide alone.

The addition sequence of the reactants is not critical; either reactant may be added to the other in the reaction medium. It is preferable, from the standpoint of ease of handling, that the amide reactant be added gradually over a period of time to the caustic hydrolysis agent maintained in the molten state in the reaction zone. This sequence encourages complete conversion and discourages amine accumulation in the reaction zone. Especially desirable results are achieved when the addition rate of amide to caustic is equal to the rate of distillation of the amine from the reaction zone.

The reaction of our invention may be carried out in very short reaction times. As a desirable range, the residence time for complete conversion of amide to amine is from about 1 to 30 minutes; the preferred range being from about 5 to 15 minutes. The actual contact time between the reactants and the products is dependent generally on other variables, such as depth of the molten caustic, surface area of the caustic, temperature, amount of reflux within the reaction zone, agitation, and chain length of the amide hydrolyzed.

The reaction may be carried out over a wide range of temperatures. Generally, temperatures from about 150° C. to 450° C. are desirable. A preferred temperature range will be that occurring above the boiling point of the amine to be prepared but below the boiling point of the amide reactant. When the reaction temperature is too high there is a tendency for the amide to flash out of the reaction mixture, resulting in incomplete conversion to amine due to the decreased time of contact between the molten caustic and the amide. On the other hand, maintaining the reaction temperature too low may also result in incomplete conversion and that amine which is formed will tend to accumulate in the reaction zone.

The amines produced according to our process may be separated from the reaction mixture by any suitable technique; but generally maintaining the temperature range of the reaction mixture at temperatures above the boiling point of the amine assures that it will vaporize out of the reaction mixture as it is formed, and it may then be collected by any suitable technique. This allows an easily operable continuous process such as by gradually contacting amide reactant with an excess of the caustic hydrolysis agent in the reaction zone and maintained in the molten state to rapidly form the amine, which distills out of the reaction mixture as it is formed, and collecting the amine by any suitable means. Also, any amine distillate which may still contain unreacted amide, obtained on one pass through the reaction zone, may be further hydrolyzed with additional molten caustic to further increase the conversion percentage of amide to amine.

The process of our invention may be conducted either batch-wise or continuously using any suitable apparatus such as a reactor made of, or lined with, corrosion resistant materials such as silver, stainless steel, Monel, nickel and the like.

In order to more fully understand the nature of our invention and the characteristics and manner in which the reactants may be used, the following specific examples are provided.

EXAMPLE I

Hydrolysis of N-($C_{11}$–$C_{14}$ sec.-alkyl) formamide with molten sodium hydroxide A cylindrical Monel reactor (8 inches high and two inches inside diameter), equipped with a stirrer, thermocouple, amide inlet tube, heating mantle, Claisen head, condenser and receiver, is charged with 80.0 grams of sodium hydroxide (2.0 moles). The caustic is brought into the molten state with heat, and 235.5 grams of N-($C_{11}$–$C_{14}$ sec.-alkyl) formamide (90.5% amide, containing 0.92 mole of amide) is pumped into the reactor at 310–350° C. (mainly at 330–335° C.) at a rate of 2.33 grams per minute. During this time, 179.5 grams of pale yellow oil distilled over at 209–226° C. in essentially quantitative yield.

Analysis:
- Amine _____ percent__ 96.6
- Formamide _____ nil
- Iodine value _____ 6.9

The inorganic material left in the reactor was washed with ether to remove the organic impurities. After drying, 100.0 grams of grey powder was obtained that was shown to consist of 93.3% $Na_2CO_3$ and 0.4% NaOH.

EXAMPLE II

Hydrolysis of N-($C_{11}$–$C_{14}$ sec.-alkyl) acetamide with molten sodium hydroxide Using the same apparatus as in Example I with a Claisen head-Vigreux column combination fractioning column of 35 cm. length, 1056.0 grams of a crude amide (73.6% amide, 17.3% amine, 0.7% $H_2O$, containing 3.32 moles of amide and 0.952 moles of amine) is added at a rate of 1.50 grams per minute to 394.6 grams (9.86 moles) of the stirred molten caustic and allowed to react at 343–404° C. During this time, 772.6 grams of distillate was collected at 215–230° C. On stripping under aspirator vacuum to remove water and other volatiles, 715 grams of pale yellow product was obtained that analyzed as follows:

Analysis:
- Amine _____ percent__ 80.7
- Amide _____ do____ 12.6
- Iodine value _____ 10.9
- Water _____ percent__ 1.3

This distillate accounts for 79.3% of the original amide and amine that was subjected to hydrolysis. The organic residue that was left in the reactor was taken up in ether. Upon concentration in vacuo, 92.0 grams of dark oil was obtained that had the following composition, based on infrared analysis:

Analysis: Percent
- Amine _____ 72.0
- Amide _____ 26.6

The total amine and amide present in the distillate and the residue accounts for 89.8% of the amide and amine that was present in the crude used in the hydrolysis. 82.25% of the amide present in the crude was hydrolyzed to the corresponding amine.

670 grams of the distillate obtained from the above hydrolysis (80.7% amine, 12.6% amide, containing 2.82 moles of amine and 0.036 moles of amide) was further hydrolyzed with 443.0 grams of fresh sodium hydroxide (11.090 moles). The hydrolysis was carried out as above except that in place of a 35 cm. Vigreux column, one with a length of 15 cm. was used. The amine-amide mixture was pumped in at a rate of 1.45 grams per minute at 365–380° C., and 634.1 grams of product distilled over at 228–235° C.

Analysis:
- Amine _____ percent__ 95.6
- Amide _____ nil
- Iodine value _____ 9.7
- Water _____ percent__ 0.43

99.0% of the amine-amide mixture subjected to hydrolysis is accounted for as amine in the above product.

EXAMPLE III

Hydrolysis of N-($C_{11}$–$C_{14}$ sec.-alkyl) acetamides with molten 90% NaOH—$H_2O$ In like manner (as in Example I), 80.0 grams of sodium hydroxide (2.0 moles) and 8.0 grams of water, and 234.0 grams of the crude amide (73.7% amide, 18.0% amine, 3.72% $H_2O$, iodine value of 6.85, containing 0.737 mole of amide and 0.216 mole of amine) can be reacted at 275–289° C. for one hour and 47 minutes (addition rate of amine 2.19 grams per minute). 133.3 grams of pale yellow product distills over at 58–244° C.

Analysis:
- Amine _____ percent__ 92.9
- Amide _____ do____ 5.4
- Iodine value _____ 3.6
- Water _____ percent__ 8.1

The organic residue remaining in the reactor is taken up in ether, and the ether solution washed free of caustic. Concentration in vacuo gives 75.2 grams of a dark oil.

Analysis:
- Amine _____ percent__ 69.5
- Amide _____ do____ 12.7
- Iodine value _____ 9.1
- Water _____ percent__ 0.63

The total amine and amide present in the distillate and residue product accounts for 98.0% of the amide and amine that was present in the crude amide used in the hydrolysis. 90.6% of the amide was converted to the corresponding amine.

EXAMPLE IV

Hydrolysis of N-($C_{15}$–$C_{20}$ sec.-alkyl) acetamide with molten sodium hydroxide Using the apparatus of Example I with the addition of a Claisen head-Vigreux column combination fractionation column of 18 cm. length, 438.5 grams of the crude amide (86.3% amide, 0.201% amine, iodine value 6.3, 0.2% water, containing 1.232 moles of amide and 0.0033 mole of amine) is pumped into 400 grams of molten sodium hydroxide (10.0 moles) at 360–401° C. over a period of 3 hours and 53 minutes (addition rate of amide 1.88 grams per minute). During this time, 325.5 grams of pale yellow product was collected that distilled over at head temperatures exceeding 360° C. (1.055 moles of amine representing a yield of 85.6%).

Analysis:
- Neutralization equivalent _____ 308.7
- Activity _____ percent__ 85.9
- Amide (by infrared analysis) _____ do____ 2.5

EXAMPLE V

Hydrolysis of N-($C_7$–$C_9$ sec.-alkyl) acetamide with molten sodium hydroxide-potassium hydroxide An 8 inch high, 2 inch inside diameter cylindrical Monel reactor, equipped with stirrer, thermocouple, amide inlet tube, heating mantle, Claisen head-Vigreux column combination fractionating column of 18 cm. length and a condenser and receiver, is charged with a mixture of 240 grams of sodium hydroxide (6.0 moles) and 160 grams of potassium hydroxide (2.85 moles). This mixture represents 60% of NaOH and 40% of KOH, by weight. The mixed caustics are brought into a molten state and 353.0 grams of N-($C_7$–$C_9$ sec.-alkyl) acetamide (92.5% amide, 1.38% amine, iodine value 9.06, 3.0% $H_2O$, containing 1.92 moles of amide and 0.038 mole of amine) is pumped in with stirring over a period of 178 minutes (addition rate of 1.98 grams amide per minute) at 260–280° C. (mainly at 260–270° C.). During this time 245.4 grams of pale yellow product distilled over at 111–160° C. (mainly at 150–155° C.).

Analysis:
- Amide _____ percent__ 1.5
- Amine _____ do____ 90.0
- Iodine value _____ 12.6
- Water _____ percent__ 6.5

The above product contains 1.725 moles of amine and 0.0218 mole of amide, representing a total of 89.4% of amine-amide used in the hydrolysis.

In addition to the above product, 10.5 grams of yellow oil distilled over at the end of the reaction at a temperature of 127–235° C. Based on the neutralization equivalent, this fraction contains 70.0% amine (0.0574 moles of amine).

EXAMPLE VI

Hydrolysis of N-dodecylformamide with molten sodium hydroxide

Using the apparatus of Example V, but substituting a Claisen head-Vigreux column combination distillation column of 7 inch length for the fractionating column of Example V, the reactor is charged with 144.0 grams of sodium hydroxide (3.60 moles). The caustic is brought into the molten state and 185.0 grams of N-dodecylformamide (95.5% amide, containing 0.827 mole of amide) is pumped in at a temperature of 331–380° C. over a period of 86 minutes. During this time, 150.9 grams of water-white oil distilled over at 190–247° C. This oil, n-dodecylamine, solidified on cooling (yield of 96.5%, containing 0.797 mole of amine).

Analysis:
  Neutralization equivalent _____ 189.0
  Activity _____percent__ 98.0

EXAMPLE VII

Hydrolysis of N-($C_{12}$–$C_{14}$-tertiary-alkyl) formamide (Rohm and Haas Primid F–12) with molten sodium hydroxide Using the same equipment as in Example VI, the reactor is charged with 144.0 grams of sodium hydroxide (3.60 moles). The caustic is heated and brought into the molten state, and 265.0 grams of Primid F–12 (1.12 moles) is pumped in at 358–386° C. over a period of 124 minutes (addition rate 2.15 grams per minute). During this time, 215.8 grams of water-white oil distilled over at 184–200° C.

Analysis:
  Neutralization equivalent _____ 189.0
  Mass yield _____percent__ 93.2

EXAMPLE VIII

Hydrolysis of m-acetotoluidide with molten sodium hydroxide

A cylindrical Monel reactor such as described in previous examples, was charged with a mixture of 80.0 grams of sodium hydroxide (2.0 moles) and 120.0 grams of potassium hydroxide (2.4 moles). The mixture was heated until molten and 241.5 grams of m-acetotoluidide (1.63 moles of amide) is pumped in at 280–300° C. over a period of 90 minutes (addition rate 2.68 grams per minute). During this time, 176.3 grams of yellow oil distilled over at 82–197° C. vapor temperature. The oil was dissolved in ether and washed with water. The ether solution was then dried and stripped under reduced pressure to yield 131.5 grams of yellow oil (75.3% crude mass yield) having the following analysis:

Neutralization equivalent _____ 108
Activity _____percent__ 99.2

EXAMPLE IX

Hydrolysis of N-methyl-N-dodecylacetamide with molten sodium hydroxide

A cylindrical Monel reactor, such as described in previous examples, was charged with 160.0 grams of sodium hydroxide (4.0 moles), the caustic was then heated until molten and 106.0 grams of N-methyl-N-dodecylacetamide (0.413 mole of amide) is pumped in at 330–357° C. over a period of 70 minutes (addition rate 1.51 grams per minute). During this time, 54.9 grams of pale yellow oil distilled over at 122–171° C. vapor temperature. The oil was dissolved in ether and washed with water. The ether solution was then dried and stripped under reduced pressure to yield 81.6 grams of almost water-white oil (91.5% crude mass yield) having the following analysis:

Neutralization equivalent _____ 317
Activity _____percent__ 68.2

EXAMPLE X

Hydrolysis of N,N-dicocoacetamide with molten sodium hydroxide

A cylindrical Monel reactor, such as described in previous examples, was charged with 160.0 grams of sodium hydroxide (4.0 moles). The caustic is heated until molten and 183.4 grams of N,N-dicocoacetamide (3.1% free amine, 0.423 mole or amide) is pumped in at 350–410° C. over a period of 4 hours (addition rate 0.76 grams per minute). During this time, 149.4 grams of yellow oil distilled over at 306–410° C. vapor temperature. The oil was dissolved in ether and washed with water. The ether solution was then dried and stripped under reduced pressure to yield 133.8 grams of yellow oil (80.7% crude mass yield) having the following analysis:

Neutralization equivalent _____ 542
Activity _____percent__ 72.4

The foregoing specification has set out specific process conditions, reactants, proportions, product compositions and other factors in considerable detail for the purpose of illustrating some embodiments of our invention. It is clear that these may be varied widely by those skilled in the art without departing from the spirit and scope of our invention.

We claim:

1. In a process for preparing primary and secondary amines wherein a mono- or di-substituted amide is reacted with a caustic hydrolysis agent, the improvement consisting essentially of maintaining said caustic hydrolysis agent in the molten state to form the amine, said caustic agent being present in quantity to said amide in mole ratio of at least 1:1; and separating said amine from the reaction mixture.

2. The process of claim 1 in which said mole ratio ranges from about 2:1 to about 20:1.

3. The process of claim 2 in which said mole ratio ranges from about 2.5:1 to about 10:1.

4. The process of claim 1 in which the reaction temperature is above the boiling point of the amine and below the boiling point of the amide.

5. The process of claim 1 in which said caustic hydrolysis agent is selected from the group consisting of sodium hydroxide, potassium hydroxide and mixtures thereof.

6. The process of claim 1 in which the amide is an alkyl amide selected from the group consisting of primary-alkyl substituted, secondary-alkyl substituted, and tertiary-alkyl substituted amides.

7. The process of claim 1 in which the amide is an aryl amide.

8. The process of claim 6 in which said primary-alkyl substituted amide has the structure

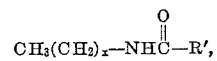

said secondary-alkyl substituted amide has the structure

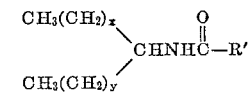

and said tertiary-alkyl substituted amide has the structure

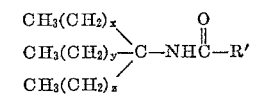

wherein $x$, $y$ and $z$ are each integers whose sum in any particular molecule is from 0 to 46, and R' is selected from the group consisting of H and alkyl radicals having from 1 to 6 carbon atoms.

9. The process of claim 8 in which R' is selected from the group consisting of H and methyl.

10. The process for preparing N-secondary alkyl amines comprising reacting, at a temperature above the boiling point of the amine and below the boiling point of the amide, an N-sec-alkyl amide with a molten caustic hydrolysis agent selected from the group consisting of sodium hydroxide, potassium hydroxide and mixtures thereof to form the amine, said caustic agent being present in quantity to said amide in mole ratio of at least 1:1; and separating said amine as it is formed from the reaction mixture.

11. In a process for preparing primary and secondary amines wherein a mono- or di- substituted amide is reacted with a caustic hydrolysis agent, the improvement consisting of maintaining said caustic hydrolysis agent in the molten state to form the amine, said caustic agent being present in quantity to said amide in mole ratio of at least 1:1.

12. The process for preparing N-secondary alkyl amines comprising reacting, at a temperature above the boiling point of the amine and below the boiling point of the amide, an N-sec-alkyl amide with a caustic hydrolysis agent in molten form selected from the group consisting of sodium hydroxide, potassium hydroxide and mixtures thereof to form the amine, said caustic agent being present in quantity to said amide in mole ratio of at least 1:1.

References Cited

UNITED STATES PATENTS 2,773,097  12/1956  Albert et al. _____ 260—583 X

CHARLES B. PARKER, Primary Examiner

R. L. RAYMOND, Assistant Examiner

U.S. Cl. X.R.

23—63; 260—578, 668, 676